(12) United States Patent
Ephanov

(10) Patent No.: US 6,924,814 B1
(45) Date of Patent: Aug. 2, 2005

(54) SYSTEM AND METHOD FOR SIMULATING CLIP TEXTURING

(75) Inventor: Anton Ephanov, Dallas, TX (US)

(73) Assignee: Computer Associates Think, Inc., Islandia, NY (US)

( * ) Notice: Subject to any disclaimer, the term of this patent is extended or adjusted under 35 U.S.C. 154(b) by 273 days.

(21) Appl. No.: 09/652,201

(22) Filed: Aug. 31, 2000

(51) Int. Cl.[7] ................................................. G09G 5/00
(52) U.S. Cl. ...................................................... 345/582
(58) Field of Search ................................ 345/428, 582, 345/587, 590, 620, 622

(56) References Cited

U.S. PATENT DOCUMENTS

| | | | |
|---|---|---|---|
| 6,304,271 B1 * | 10/2001 | Nehme ........................ | 345/620 |
| 6,456,288 B1 * | 9/2002 | Brockway et al. ........... | 345/428 |
| 6,747,649 B1 * | 6/2004 | Sanz-Pastor et al. ........ | 345/428 |
| 2004/0012604 A1 * | 1/2004 | Farinelli ..................... | 345/587 |

OTHER PUBLICATIONS

Christopher C. Tanner, Christopher J. Migdal and Michael T. Jones, "The Clipmap: A Virtual Mipmap", in Computer Graphics Proceedings, Annual Conference Series, 1998, pp. 151–158.

Erik Riedel, Catherine van Ingen, Jim Gray, "Sequential I/O on Windows NT 4.0—Achieving Top Performance", Microsoft Research, http://www.research.microsoft.com/barc/Sequential IO, pp. 1–32, Jul. 1998.

* cited by examiner

*Primary Examiner*—Matthew C. Bella
*Assistant Examiner*—G. F. Cunningham
(74) *Attorney, Agent, or Firm*—Cooper & Dunham LLP

(57) ABSTRACT

A method of simulating clip texturing. A clip stack of a portion of a texture image is provided, the clip stack having a plurality of levels, wherein each level includes data representing the portion of the texture image at a different resolution. For at least one of the plurality of levels, a stack of images is generated, wherein each stack of images includes data representing a plurality of correlated images of increasingly reduced resolution. A geometry formed of at least one graphic primitive is rendered, using one of the stacks of images generated.

16 Claims, 18 Drawing Sheets

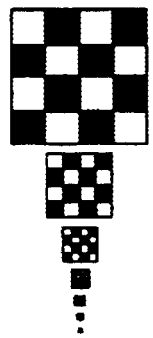 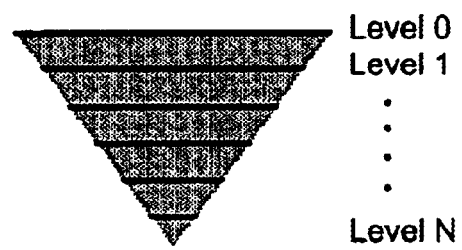 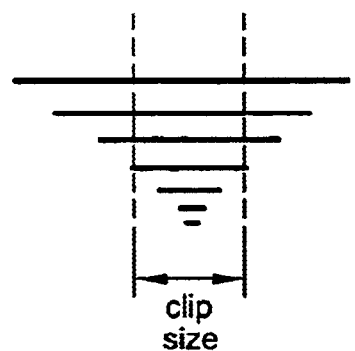 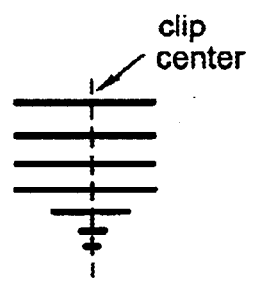
FIG. 1A  FIG. 1B  FIG. 1C
FIG. 1D  FIG. 1E

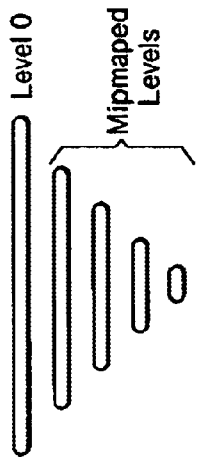
FIG. 2B
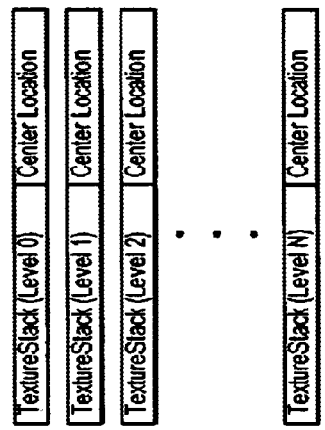
FIG. 2D
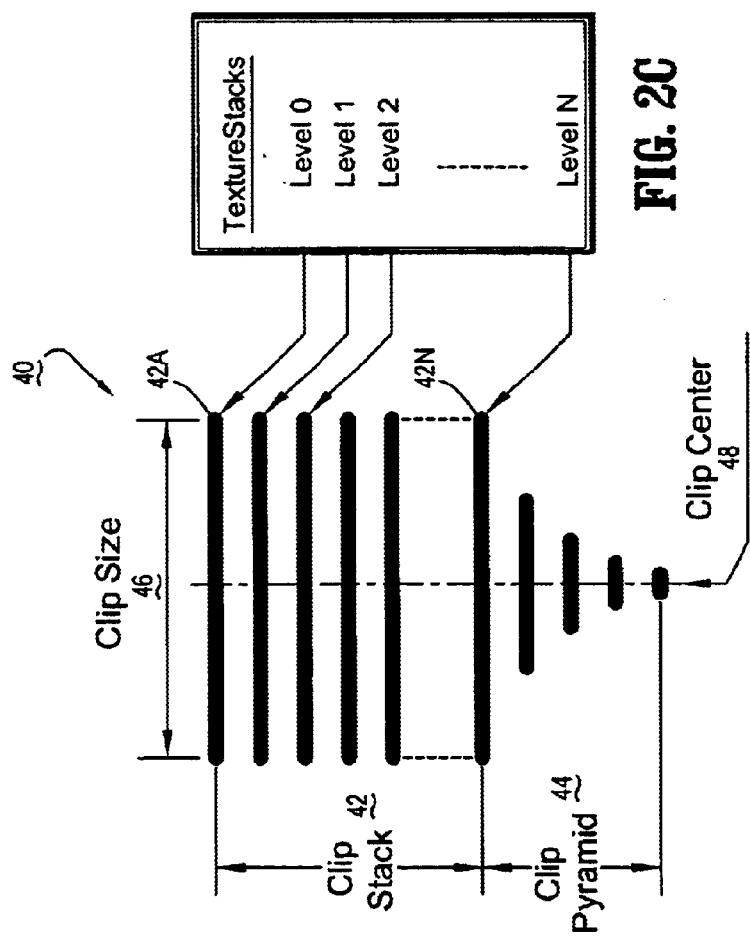
FIG. 2C
FIG. 2A

SYSTEM AND METHOD FOR SIMULATING CLIP TEXTURING

BACKGROUND

1. Field of the Disclosure

The present disclosure relates to texturing and, more specifically to a system and method for simulating clip texturing.

2. Description of the Related Art

Textures play a significant role in adding realism to a visual simulation. As real-time visual simulations require more visual fidelity, the role of textures increases. Modeling of the earth's surface or its regions, for example, presents even greater challenges, since database developers must rely heavily on geo-specific textures. Efficient real-time rendering of such databases at stable or interactive frame rates is complicated by the amount of image data that must be used for texturing by the rendering hardware. For instance, representing the earth with one-meter texels requires a 40 million by 20 million texel texture.

Texture mapping can be used to render or draw an image on an object. Generally speaking, texture mapping is the mapping of an image or a function onto a surface in three dimensions. Texture mapping can be used for creating the appearance of a complex image without the tedium and the high computational cost of rendering or drawing the actual three dimensional detail found on the surface of the object.

Parameters which can be texture mapped onto a graphic primitive include surface color, specular reflection, specularity, transparency, diffuse reflections, normal vector perturbation, and shadows. Using texture mapping, a source image, referred to as the texture map, is mapped onto a surface in three dimensional space. The three dimensional surface is then mapped to the destination image which is then displayed on a graphic display screen, for example. The texture map is formed of texture elements referred to as texels.

A graphic primitive is one of the basic components of a graphic picture. All graphic pictures are formed using combinations of the graphic primitives by rendering or drawing the graphic primitives to the screen. Computer graphic systems typically store descriptions of primitives, object attributes, connectivity relationships and positioning data. The primitives may be points, lines, polygons, etc. in two dimensional (2D) or three dimensional (3D) form, and polyhedra and free-form surfaces in 3D form that define the shape of components of the object. Object attributes include linestyle, color, surface texture, etc. Connectivity and positioning data describe how object components fit together.

However, present graphics hardware systems are unable to handle the large amounts of texture information typically required, especially at interactive frame rates. Therefore, approaches for dealing with large amounts of texture data have been explored.

There are two common methods for dealing with large textures. The first method requires subdividing a large texture into small tiles that can be more easily handled by most graphic hardware systems. This is commonly referred to as tiling. One major disadvantage of the tiling approach is that geometric primitives must not cross texture-tile boundaries, which imposes undesired geometric subdivision restrictions and, therefore, complicates database design.

Other methods use texture filtering techniques. One type of texture filtering technique pre-computes filtered versions of a texture map and stores the pre-computed versions in memory. This pre-filtered version of the texture map is referred to as a mipmap (multum in parvo—many things in a small place) map.

As shown in FIG. 1A, a mipmap is a collection of correlated images of increasingly reduced resolution arranged, in spirit, as a resolution pyramid. As shown in FIGS. 1B, 1C, starting with level 0, the largest and most detailed level, each lower level represents the image using half as many texels in each direction. In effect, each mipmap level corresponds to a level of detail (LOD) value.

When rendering with a mipmap, pixels are projected into mipmap space using texture coordinates, underlying geometric positions, geometric transformations, and texture transformations to define a projection. Each rendered pixel is derived from one or more texel samples taken from one or more levels of the mipmap hierarchy. The texels may then be filtered to produce a single value for further processing. One texture filtering technique using mipmaps equates each pixel value with an associated aggregate texel value in the mipmap most closely associated with a level of detail value. For example, if an LOD value is 2.35, each pixel will be set equal to the value of an associated aggregate texel in the level 2 mipmap. A bilinear filtering technique may also be used to obtain a weighted average of four texel values from a single mipmap level that surround the pixel center. Trilinear filtering is a technique in which if the LOD value has a non-zero fractional part, bilinear filtering is performed for both the lower level mipmap and the higher level mipmap. A pixel value is then determined by calculating a weighted average of the two resulting values.

Clipmap is based on the idea of mipmap. Clipmap is an updatable representation of a partial mipmap, in which each level is clipped to a specified maximum clip size, as shown in FIG. 1D. As shown in FIG. 1E, the result of such parameterization is an obelisk shape for clipmaps as opposed to the pyramid shape for the mipmaps. The clip size represents a limit, specified in texels, of texture cache extent for any single level of a clipmap texture. Only a clip size subset of the mipmap stack levels is cached. Given the notion of clipping a mipmap to fit in a subset clipmap cache, a clip center for each stack level is specified as an arbitrary texture space coordinate that defines the center of the cached layer. Clip size and clip center for each level precisely define the texture region being cached by the Clip Stack levels of the clipmap.

One way of dealing with clip centers is to specify the clip center for stack level 0 (highest LOD) and derive the clip center of lower levels by shifting the center based on depth. This forces each level to be centered along a line from the level 0 center to the clipmap apex. The center location may be placed anywhere in full mipmap space. When the cache is insufficient, due either to an overly small clip size or a poor choice of clip center, the best available lower resolution data from a lower level in the clipmap stack or pyramid can be used.

Clipmap is thus a dynamic texture representation that efficiently caches textures of arbitrary large size in a finite amount of physical memory for rendering at real-time rates. Clipmap overcomes most of the limitations of other schemes and offers a very flexible and efficient solution. However, clipmap requires highly specialized hardware support and, in most cases, is cost prohibitive.

As noted above, texture mapping can be used to add realism to computer graphics images. Due to the complexity of texturing processes and the huge amount of image information that is often used in texturing, texture mapping techniques have evolved from purely software rendering systems to high performance graphics hardware such as that necessary for using the clipmap approach. However, such high performance graphics hardware can be very expensive and is out of reach of most consumers who may be interested in practicing such texturing techniques.

The present system provides an efficient system and method that applies texturing techniques typically only found on high-end systems, which is capable of running even on low-end inexpensive personal computers or other hardware platforms typically available to the average consumer. The present system thus allows the simulation of clip texturing at real-time or interactive frame rates on stock hardware with graphics acceleration. Clip-texturing can thus be simulated in a system that works very effectively and efficiently and is particularly useful for visual simulation applications.

SUMMARY

A method, system and apparatus for simulating clip texturing. A clip stack of a portion of a texture image is provided, the clip stack having a plurality of levels, wherein each level includes data representing the portion of the texture image at a different resolution. For at least one of the plurality of levels, a stack of images is generated, wherein each stack of images includes data representing a plurality of correlated images of increasingly reduced resolution. A geometry formed of at least one graphic primitive is rendered, using one of the stacks of images generated.

The method, system and apparatus may further generate for each stack of images, an object containing the data representing the plurality of correlated images of increasingly reduced resolution. Each object may further contain information identifying a location of a center of the portion of the texture image.

The method, system and apparatus may also further call a geometry, select one of the stacks of images, determine whether a bounding box which defines bounds of the geometry is covered by a bounding box which defines bounds of the selected stack of images, and if the bounding box of the geometry is not covered by the bounding box covered by the selected stack of images, select a next one of the stack of images and repeat the determining and if the bounding box of the geometry is covered by the bounding box covered by the selected stack of images render the geometry using the selected stack of images.

BRIEF DESCRIPTION OF THE DRAWINGS

A more complete appreciation of the present specification and many of the attendant advantages thereof will be readily obtained as the same becomes better understood by reference to the following detailed description when considered in connection with the accompanying drawings, wherein:

FIGS. 1A–1E show exemplary representations for describing a mipmap and a clipmap;

FIGS. 2A–2D are exemplary representations for describing clipstack levels and TextureStack objects according to embodiments;

DETAILED DESCRIPTION

Figure 3A:
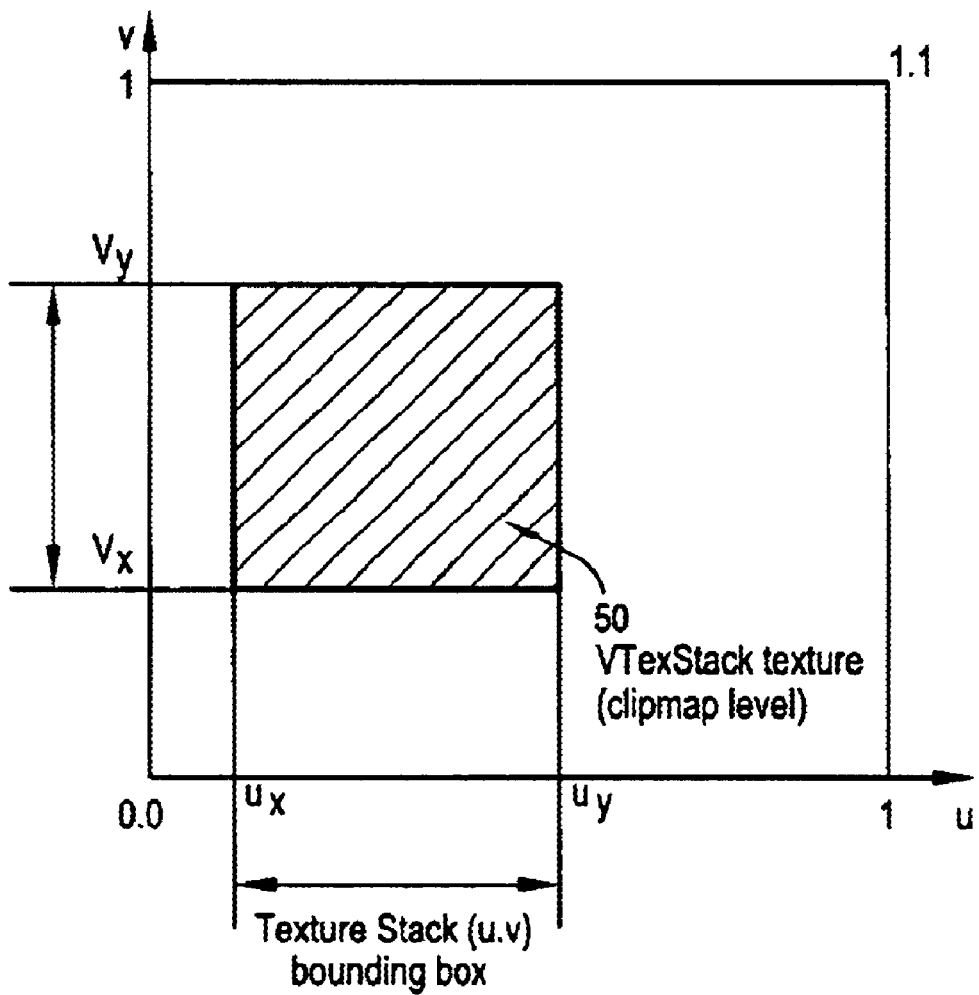
FIGS. 3A–3C are exemplary representations for describing a minimal image subregion needed to render a geometry.

In describing embodiments of the present specification illustrated in the drawings, specific terminology is employed for the sake of clarity. However, the present specification is not intended to be limited to the specific terminology so selected and it is to be understood that each specific element includes all technical equivalents which operate in a similar manner.

Figure 6:
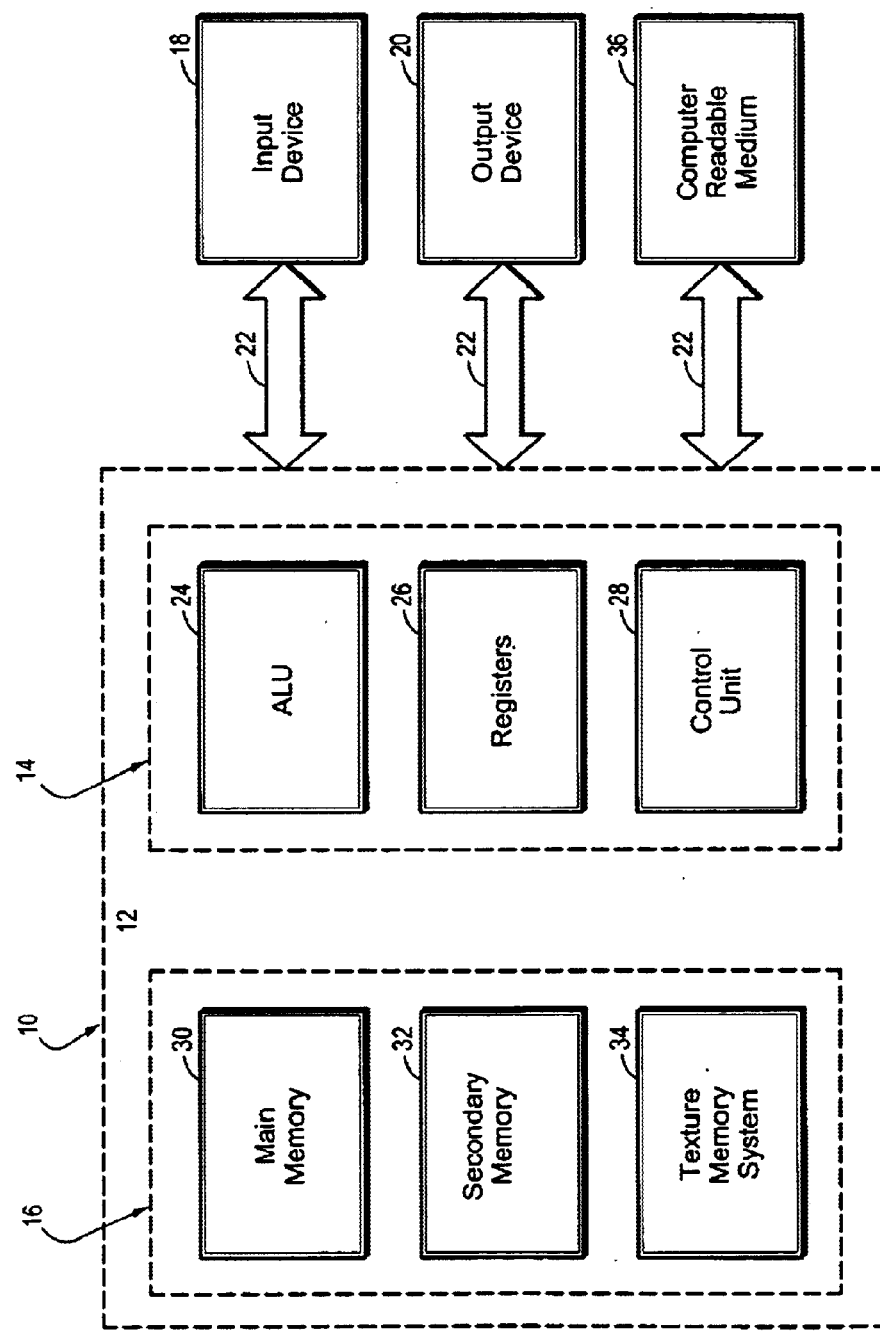
FIG. 6 is a block diagram of a computer system upon which the present disclosure may be implemented.

FIG. 6 depicts an illustrative operating environment according to an embodiment and includes a computer system 10. Computer system 10 includes a computer 12 which includes a central processing unit (CPU) 14, a memory system 16, input device 18, output device 20 and computer readable medium 36. Bus 22 may actually include one or more busses for interconnecting each of the elements of the computer system 10 and for providing information and data thereto.

CPU 14 may include an arithmetic logic unit (ALU) 24 for performing computations. Registers 26 may be provided for temporary storage of data and instructions. Control unit 28 controls operation of the computer system 10. Any of a variety of known processors may be used to implement CPU 14. In addition although only one CPU is shown, computer system 10 may alternatively be implemented using multiple processing units.

Memory system 16 includes a main memory 30 and secondary memory 32. Main memory 30 typically includes a high speed random access memory (RAM) and read only memory (ROM). Of course, main memory 30 can also include an additional or alternative high speed or low speed device or memory circuit. Secondary memory 32 typically includes long term storage devices such as ROM, optical and/or magnetic disks, organic memory, and/or any other type of volatile or non volatile mass storage system. Or course, memory 16 can include a variety and/or combination of alternative components. Memory system 16 may also include a texture memory system 34 which may or may not be separate from main memory 30. For example, texture memory system 34 may be a portion of main memory 16 dedicated to texturing processes or it may be a separate memory system from main memory 16.

Input device 18 can include one or more of a keyboard, mouse, pointing device, audio device such as a microphone, for example, and/or any other type of device providing input to the computer system 10 including MODEM, network connection including an Internet and/or local area network (LAN) connection, etc. Output device 20 may include one or more of a display, printer, MODEM, network connection, etc. Although not shown, computer system 10 may include graphics acceleration hardware and/or software.

Computer system 10 may typically further include an operating system and at least one application program. The operating system is software which controls the computer system's operation and the allocation of resources. The application program is software that performs a task desired by the user. The application program makes use of computer resources made available through the operating system. Both the operating system and the at least one application program may be resident in the memory system 16.

In accordance with the practices of a person skilled in art, the present specification is described below with reference to acts and symbolic representations of operations that are performed by computer system 10, unless indicated otherwise. Such acts and operations are sometimes referred to as being computer-executed. It will be appreciated that the acts and symbolically represented operations include the manipulations by the CPU 14 of electrical signals representing data bits which causes a resulting transformation or reduction of the electrical signal representation and the maintenance of data bits to/from memory allocations in memory system 16 and/or medium 36 to thereby reconfigure or otherwise alter the computer systems operation as well as other processings of the signals. The memory allocations where data bits are maintained are physical locations that have particular electrical, magnetic, optical or organic properties or a combination thereof, corresponding to the data bits.

The data bits may also be maintained on computer readable medium 36 which may be removable and may include disk storage such as magnetic disks and/or other volatile or non-volatile mass storage systems readable by the computer 12. The computer readable medium 36 may include cooperating or interconnective computer readable medium, which exist exclusively on the computer system 10 or are distributed among multiple inter-connective computer systems 10 that may be local or remote. Computer readable medium 36 may alternatively be provided at a remote site and accessible by computer system 10 via a LAN and/or the Internet.

In an illustrative embodiment, computer system 10 uses a Windows operating system. However, the use of other types of operating systems is also contemplated by the present disclosure.

The present description describes a clipmap technique that can be implemented using software techniques on a system such as that described above with respect to FIG. 6. The techniques thus provide many of the texturing capabilities available on high-end systems and yet can be implemented even on low-end consumer systems.

The present disclosure may be implemented utilizing any one of a number of application programmer's interface (API) or graphic software systems, including but not limited to Open Graphics Library (OpenGL), Programmer's Hierarchical Graphics System (PHIGS), the Graphical Kernal System (GKS), Java-3D and Microsoft Direct3D, for example.

For purposes of illustration only, the present disclosure describes implementations using OpenGL, although Uniform Modeling Language (UML) descriptions are also provided for a more general appreciation and understanding of the described methodology.

The task of simulating clipmap with regular OpenGL textures can be subdivided into two parts: data management and rendering. Rendering draws or renders scene geometry with texel data from a clipmap. Data management requires efficient paging of data that represents the clipmap from a storage medium such as a computer readable medium 36 which may comprise a disk, for example, to its destination which can include texture memory system 34, for example.

OpenGL in general allows the use of a mipmaping technique which creates a series of texture arrays at reduced sizes and then automatically uses the appropriate size. For example, for a 64×64 original array, 32×32, 16×16, 8×8, 4×4, 2×2, and 1×1 arrays can be set up through a GL Utility (GLU) function:

gluBuild2DMipmaps(GL_TEXTURE_2D,3,64,64,GL_RGB, GL_UNSIGNED_BYTE,my-texels). (1)

The mipmaps may then be invoked automatically by specifying:

glTexParameterf(GL)TEXTURE_2D, GL_TEXTURE_MIN_ FILTER,GL_NEAREST_MIPMAP_NEAREST). (2)

Technically, OpenGL can include a multi-extension that allows the use of more than one texture for rendering. However, this feature is only an extension and not all OpenGL vendors support the feature. Accordingly, utilizing OpenGL, one texture is typically used for rendering at a time. The texture could have the mipmap levels, and, therefore, be represented as a mipmap pyramid with the base of the pyramid being no larger than maximum OpenGL texture size as returned by OpenGL driver. However, representing the "obelisk" shape of the clipmap as a single texture where several mipmap levels have identical size is not possible in standard OpenGL. Accordingly, the present system achieves maximum visual fidelity without geometry subdivision, by use of an algorithm that chooses a Clip Stack level of highest resolution possible as a texture for a specific geometry node.

According to an embodiment as shown in FIG. 2, a clipmap 40 can be viewed as divided into two portions, Clip Stack portion 42 and Clip Pyramid portion 44. The Clip Pyramid portion 44 can be represented as a mipmaped OpenGL texture. The mipmaped OpenGL texture for Clip Pyramid portion 44 is set so that its size (ClipSize 46) is no greater than maximum OpenGL texture size as supported by hardware. The Clip Stack portion 42 includes a number of levels (Level 0–Level N). Each level of Clip Stack Portion 42 may be a square image of size ClipSize 46. Each Clip Stack level is fully defined by its size (ClipSize 46) and the location of its center (ClipCenter 48) in the image space of the corresponding mipmap level of the virtual texture.

As noted above, representing the "obelisk" shape of ClipStack portion 42 as a single texture where several mipmap levels have identical size is not possible in standard OpenGL. Accordingly, in this embodiment, each level of Clip Stack 42 can be represented as a separate OpenGL texture with its own mipmap levels (see FIG. 2B). Therefore, the clipmap representation can be effectively replaced with a number of mipmaped OpenGL textures. The first texture 42A corresponds to level 0 of the Clip Stack. The last texture 42N is the Clip Pyramid 44.

Each texture or level is encapsulated in an object which will be referred to herein as a TextureStack object, as shown in FIG. 2C. Besides the image data (or texture), each TextureStack object may also include the location of the center of the corresponding Clip Stack level (FIG. 2D).

The Clip Stack level center (ClipCenter 48) and its size (ClipSize 46) fully define a bounding box of the TextureStack object in the texture coordinate space and is referred to as a (u,v) bounding box. For example, as shown in FIG. 3A, the hatched section 50 can be referred to as a TextureStack object (u,v) bounding box and is defined by the area bounded by coordinates [Vy-Vx] and [Uy-Ux] in this example in scaled (u,v) texture space [1,1].

Figure 3B:
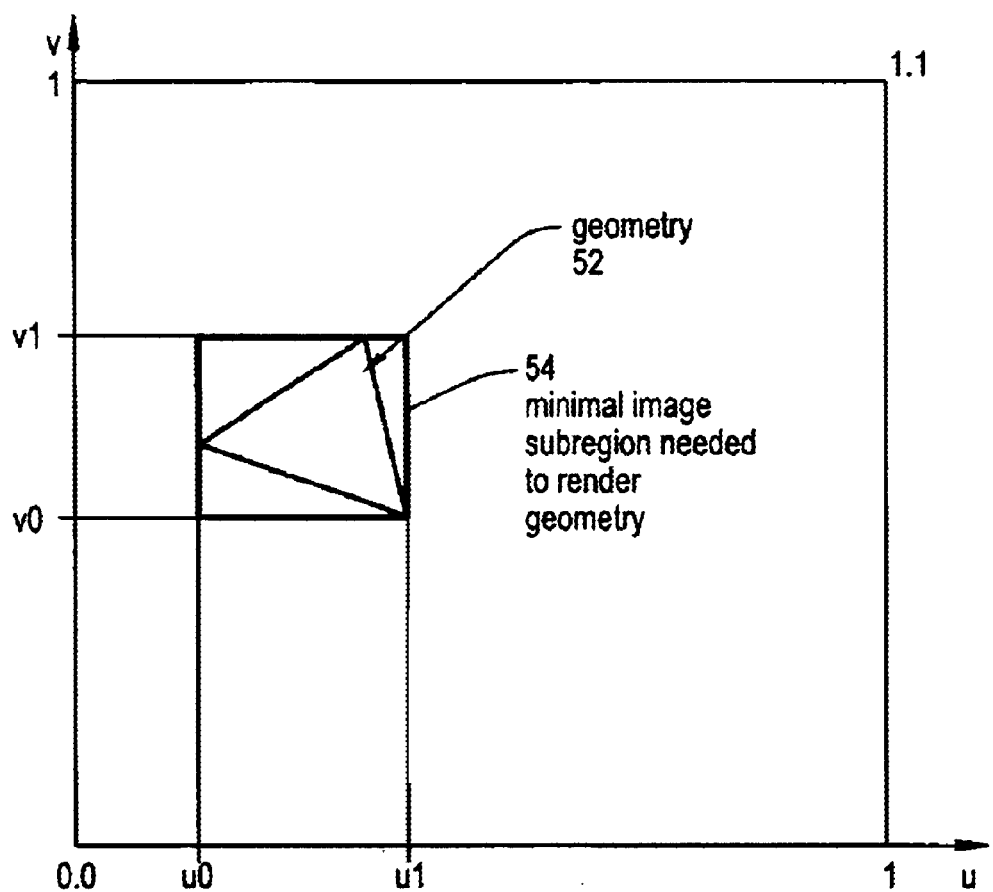
Figure 3C:
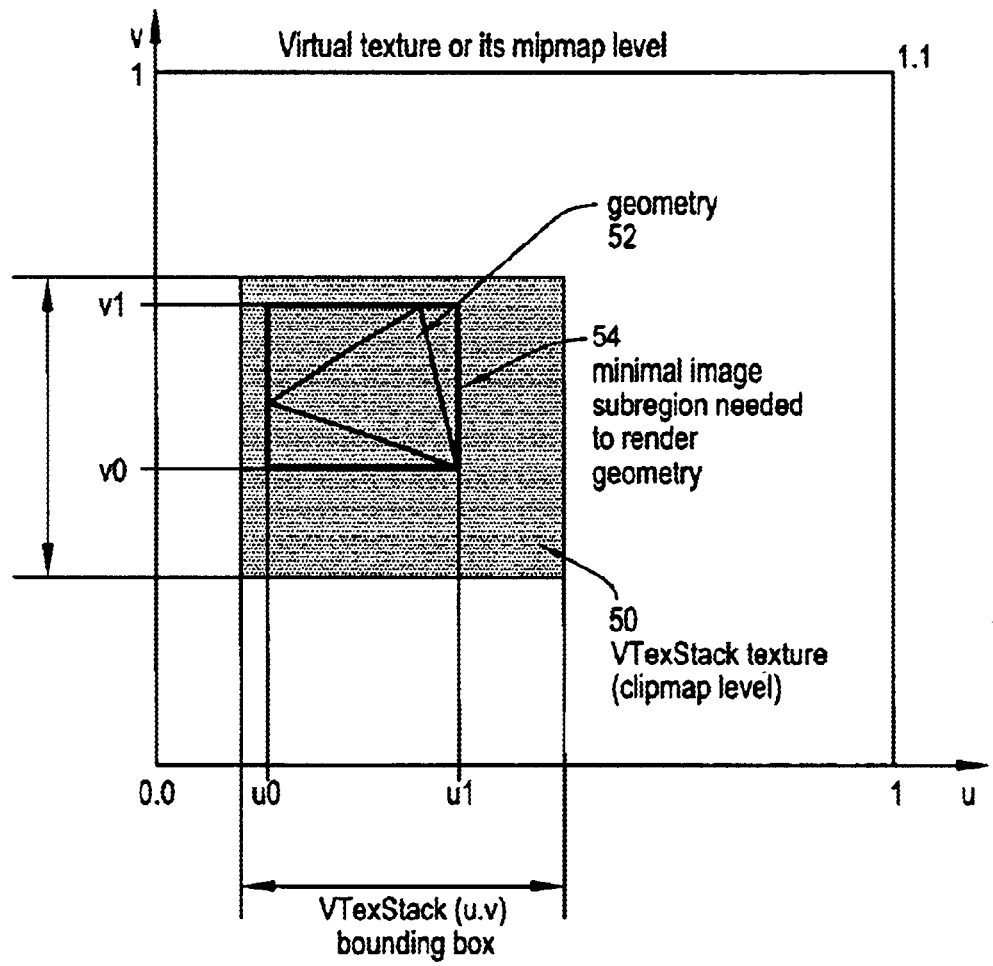

The TextureStack objects all together hold all of the image data that is in the clipmap. However, as noted above, in standard OpenGL, only one texture and, therefore, only one TextureStack object may be used for rendering a scene geometry node at a time. It is desirable to render a geometry node in a scene using the TextureStack object that corresponds to a level of highest resolution (level 0) of the Clip Stack 42. Correct trilinear texture filtering could then be achieved because the TextureStack object's texture comes with all the mipmap levels. Unfortunately, this may not be possible for all geometry nodes in the scene. Accordingly, the present embodiment assumes that all of the geometry in the database maps into a single virtual texture. Therefore, texture coordinates of each geometry in the database will fall within the [0,1] range in both u and v texture coordinate directions. For example, as shown in FIG. 3B, geometry node 52 has a minimal texture image subregion needed for rendering (geometry node (u,v) bounding box 54). As shown in FIG. 3C, a minimal image sub-region of the virtual texture needed to render a geometry node 52 can then be determined based on the (u, v) bounding box 54 of the geometry node 52 in texture coordinate space. That is, to be rendered with a texture from a TextureStack object, the geometry node 52 has to be completely covered by the sub-region (bounding box 50) of the corresponding mipmap level of the virtual texture represented by the TextureStack object.

It is relatively easy to make a decision whether the geometry node 52 is completely covered by the TextureStack object bounding box 50 when working in the texture coordinate space. For example, it can be readily determined that geometry node 52 is completely covered by the TextureStack object if the geometry node's (u,v) bounding box 54 is completely within the (u,v) bounding box 50 of the TextureStack object, as shown in FIG. 3C.

In the present embodiment, a geometry node is not be rendered with a particular TextureStack object if the geometry node's (u,v) bounding box is larger than the (u, v) bounding box of the TextureStack object itself. However, there is no limitation that geometric primitives must not cross texture-tile boundaries, as may be required in tiling.

Positioning of the centers of the TextureStack object is another important consideration. For example, suppose there is a geometry node in a scene which is desired to be rendered at the highest resolution possible. The above-mentioned (u,v) bounding box requirement indicates that the TextureStack objects should be positioned at run-time such that their centers are aligned with the center of the geometry's bounding box in texture coordinate space. In this way, the probability that the geometry node would fit within the texture coordinate bounding box of the TextureStack object with the highest resolution is maximized. Accordingly, prior to drawing, a clip center can be positioned by a user using any one of a number of clip center positioning strategies. The particular strategy selected typically depends on the application. During a pre-drawing phase, the clip centers of the TextureStacks can be aligned with one of the geometry nodes in the scene. The clip centers may then be fixed during the drawing phase.

If the geometry node is too large to fit within the TextureStack object's bounding box, then the next TextureStack object having the next lower LOD (half the image resolution) is selected. The bounding box of the TextureStack object with the next lower resolution would be two times larger in texels in both directions, respectively. A determination can then again be made whether the geometry node is still too large to fit within the TextureStack bounding box. This selection and determination proceeds until a TextureStack object is found that completely covers the geometry node in texture space. It should be noted that finding a TextureStack object that completely covers the geometry node will occur because, in the worst case scenario, the last TextureStack object that represents the base of Clip Pyramid 44 would be selected. The texture or image of the base of the Clip Pyramid 44 covers the whole database in the texture coordinate (u,v) space and will thus completely cover the geometry node. The same procedure is used for selecting TextureStack objects for rendering other geometry nodes in the scene. It should also be noted that the probability that a geometry node can be rendered with a TextureStack object diminishes as the distance between the center of the TextureStack object and the (u, v) bounding box of the geometry node increases.

Figure 4A:
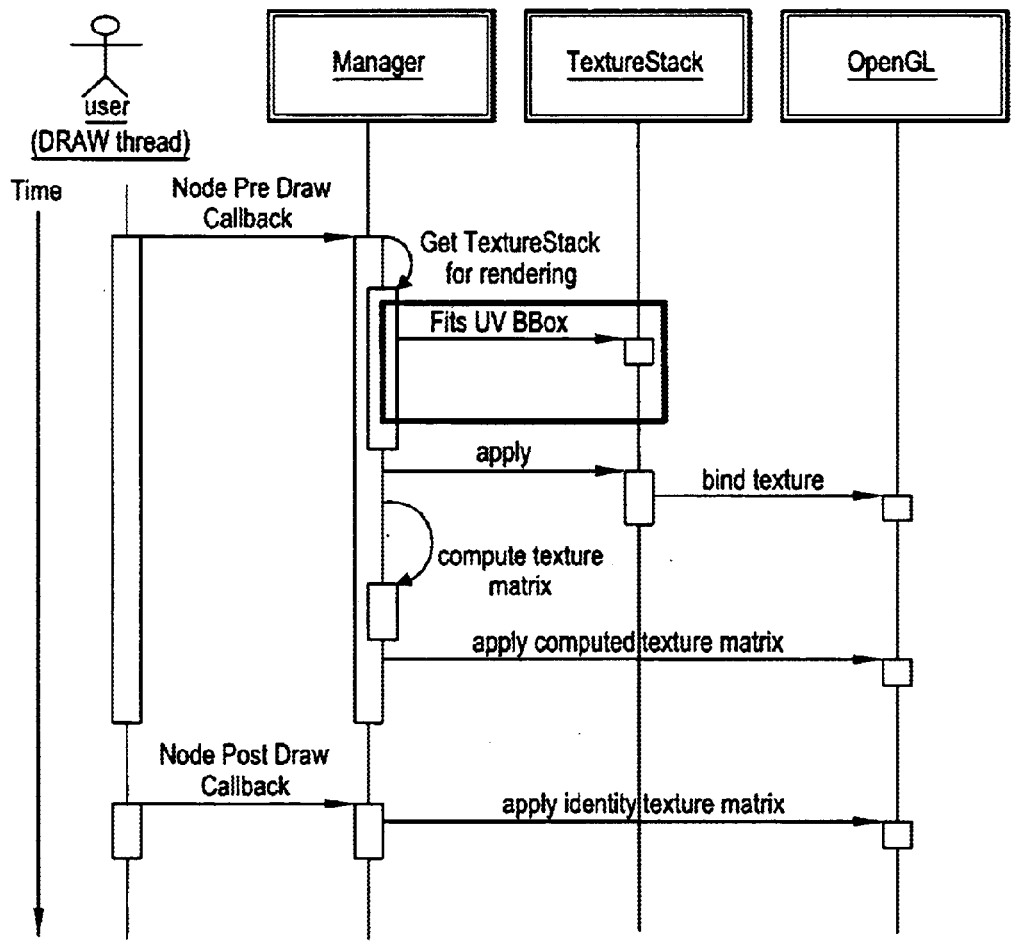
FIG. 4A is a UML activity diagram and FIG. 4B is a flow chart for describing a selection method for selecting a TextureStack object.
Figure 4B:
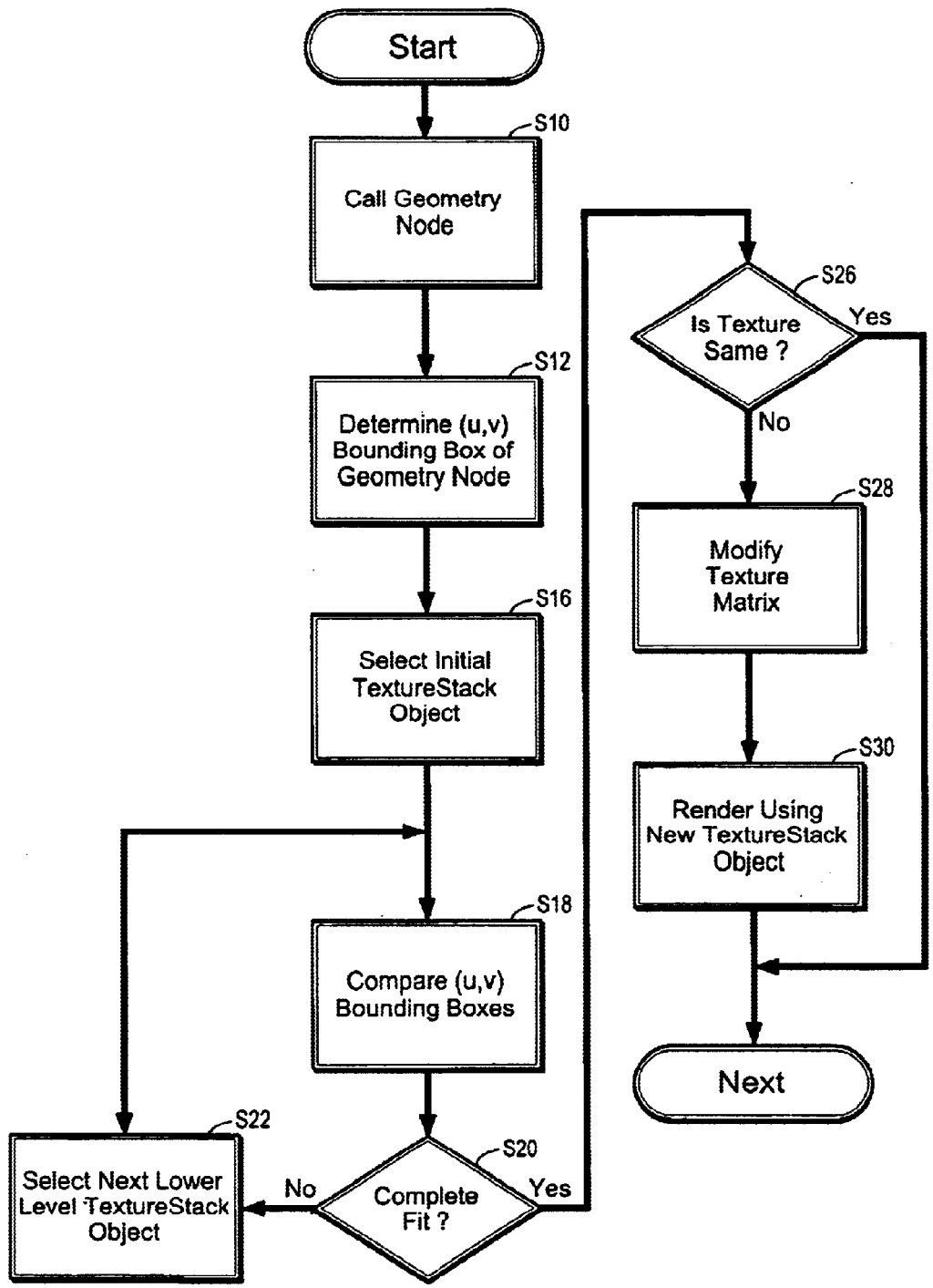

Pre and post draw callbacks are installed for every geometry node in a scene. An algorithm for selecting an appropriate TextureStack object for a geometry node during the pre-draw stage will now be described with respect to FIGS. 4A, 4B. The selection algorithm is executed in the pre-draw callback for each geometry node. FIG. 4A is a Unified Modeling Language (UML) activity diagram for the node predraw callback that executes the selection algorithm for selecting an appropriate TextureStack object. FIG. 4B is a flow diagram of the selection algorithm.

In Step S110, a geometry node to be rendered is called. Step S12 determines the (u,v) bounding box of the called geometry node. In Step S16, an initial TextureStack object is selected. In this embodiment, the TextureStack object corresponding to the clipmap having the highest LOD (Level 0) is selected. In Step S18, a comparison is made between the bounding box of the geometry node and the bounding box of the TextureStack object. If the result of Step S20 is No indicating a non fit, the next lower level TextureStack object is selected in Step S22 and the process returns to Step S18. If the bounding box of the geometry node is completely covered by the bounding box of the TextureStack object (Yes, Step S20), the TextureStack object is selected. The pre-draw callback then calls scene graph state management routines to apply the texture represented by the selected TextureStack object. The pre-draw callback may also perform a lazy texture apply process, where it checks first whether the current texture of the geometry node is identical to the texture that it is going to apply. Only if they are different are the state management routines called to apply the new texture thus minimizing the number of texture binds. For example, Step S26 may determine whether the texture is the same as that used for rendering the previous geometry node. If the result of Step S26 is Yes, the process continues and the next geometry node called. If the result of Step S26 is NO, the texture matrix is modified in Step S28 and the geometry node is rendered using texture from the new TextureStack object (Step S30).

Modification of the texture matrix as performed in Step S28 is now described. Although the TextureStack selection procedure described above insures that the highest resolution texture is used with the geometry node, unless the initial TextureStack object is used, the texture coordinates of the geometry node are no longer valid for the applied texture. Accordingly, the texture coordinates of the geometry node have to be modified to map correctly into the texture.

Modifying texture coordinates of the geometry node on the fly can be a prohibitively time consuming operation, especially if there are many geometry nodes in the scene. However, this problem can be solved by modifying the OpenGL texture matrix instead. The texture matrix is computed as a combination of two transformations: 1) uniform scaling in the directions of both texture coordinates and 2) translation in both texture coordinate directions.

Figure 5:
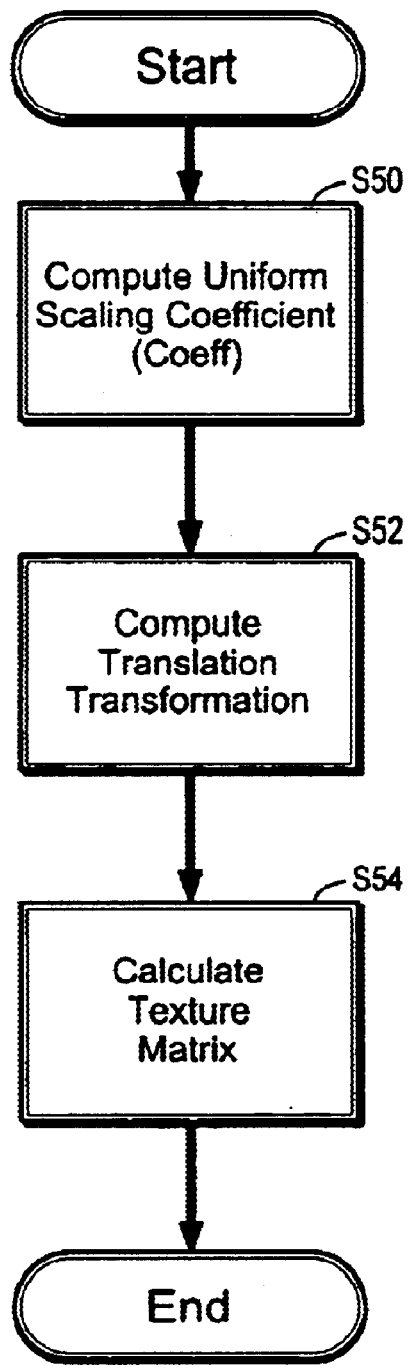
FIG. 5 is a flow chart for describing a method of modifying a texture matrix.

Referring now to FIG. 5, a uniform scaling coefficient (coeff) is computed in Step S50 based on a texel compression ratio for the Clip Stack level represented by the selected TextureStack object vs. Clip Stack level 0 (or the virtual texture image at the highest resolution). For example, the scaling coefficient can be computed using the formula:

$$coeff = texRes\_I * imgSize\_I/(texRes\_inset * imgSize\_inset) \quad (3)$$

where, texRes_I is a texel resolution in database units of the virtual texture at the highest level of resolution. The imgSize_I is the virtual texture size in texels at the highest level of resolution. The texRes_inset is the texel resolution for the selected TextureStack object, and is the same as the texel resolution of the clip level that the TextureStack object represents. The imgSize_inset is the size of the clip level that the TextureStack represents. For example, assuming a virtual texture is used that is 8192×8192 texels, with every texel representing, for example, the earth at 5 meter resolution, and further assuming the algorithm selects TextureStack number 2 for rendering, in this case, texRes_I is equal to 5.0, texRes_inset is equal to 5.0×2^2=40.0, the imgSize_I is equal to 8192 and the imgSize_inset is equal to 1024. The resulting coeff would be equal to 2.

A translation transformation is then computed in Step S52 based on the current location of the center of the Clip Stack level that is represented by the selected TextureStack object and the scaling coefficient. For example, the translational component can be computed in Step S52 based on the following formula for each texture coordinate direction:

$$Trans\_u = 0.5 + (-cc\_u) * coeff \quad (4)$$

$$Trans\_v = 0.5 + (-cc\_v) * coeff \quad (5)$$

where, cc_u and cc_v are clip center coordinates in texture coordinate space and coeff is the scaling coefficient computed in Step S50. A texture matrix calculation can then be performed in Step S54 using the formula:

$$TextureMatrix = \{(coeff\ 0\ 0\ 0), (0\ coeff\ 0\ 0), (0\ 0\ 0\ 0), (Trans\_u, Trans\_v, 0, 0)\} \quad (6)$$

The pre-draw callback loads the texture matrix, while the post-draw callback restores the OpenGL texture matrix.

In the above description, a system and method are provided describing how to simulate clipmap rendering with multiple OpenGL textures. Clipmap was replaced with an array of TextureStack objects, each representing a level of the Clip Stack with the last object representing the Clip Pyramid. A strategy was also described for positioning TextureStack objects at run-time for effective database rendering. Repositioning a TextureStack object invalidates all or some of its texture image. An effective update mechanism for the TextureStack objects is thus beneficial.

Figure 7A:
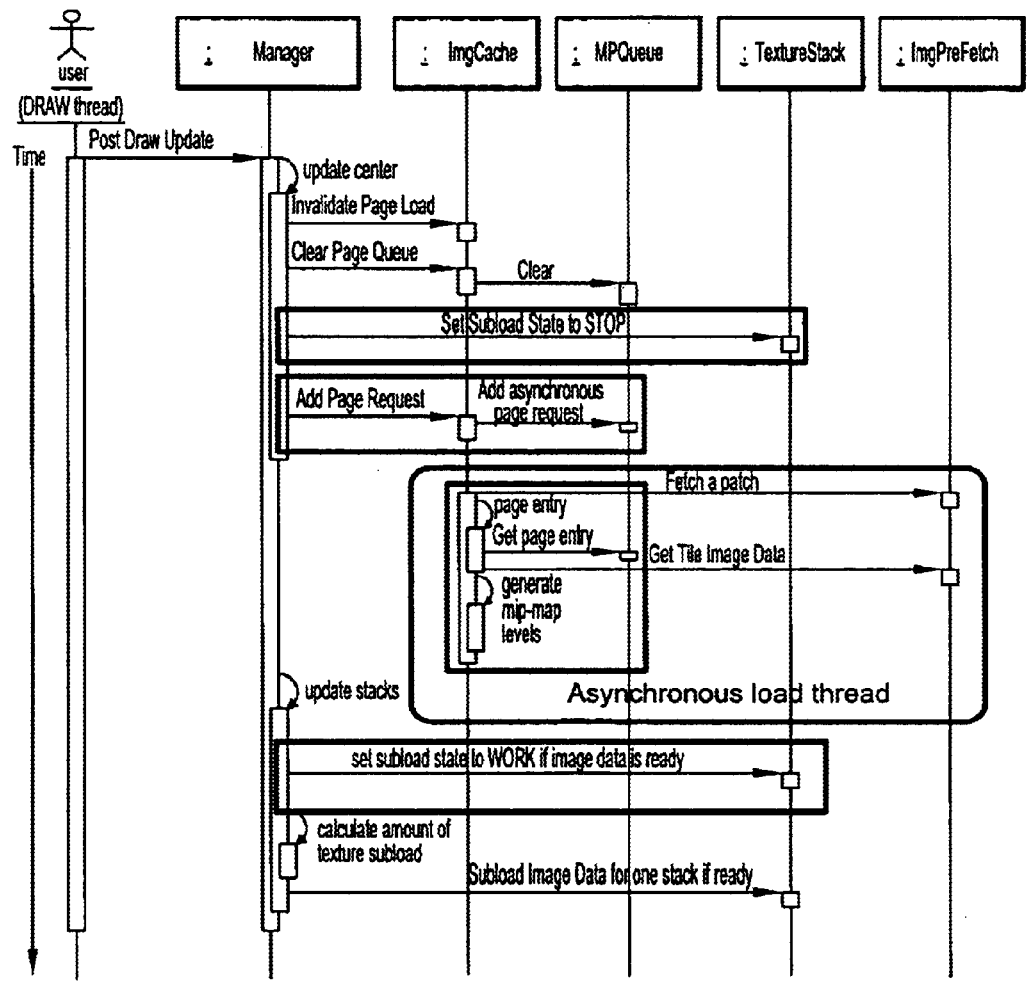
FIG. 7A is a UML activity diagram and FIG. 7B is a flowchart for describing a post draw update.
Figure 7B:
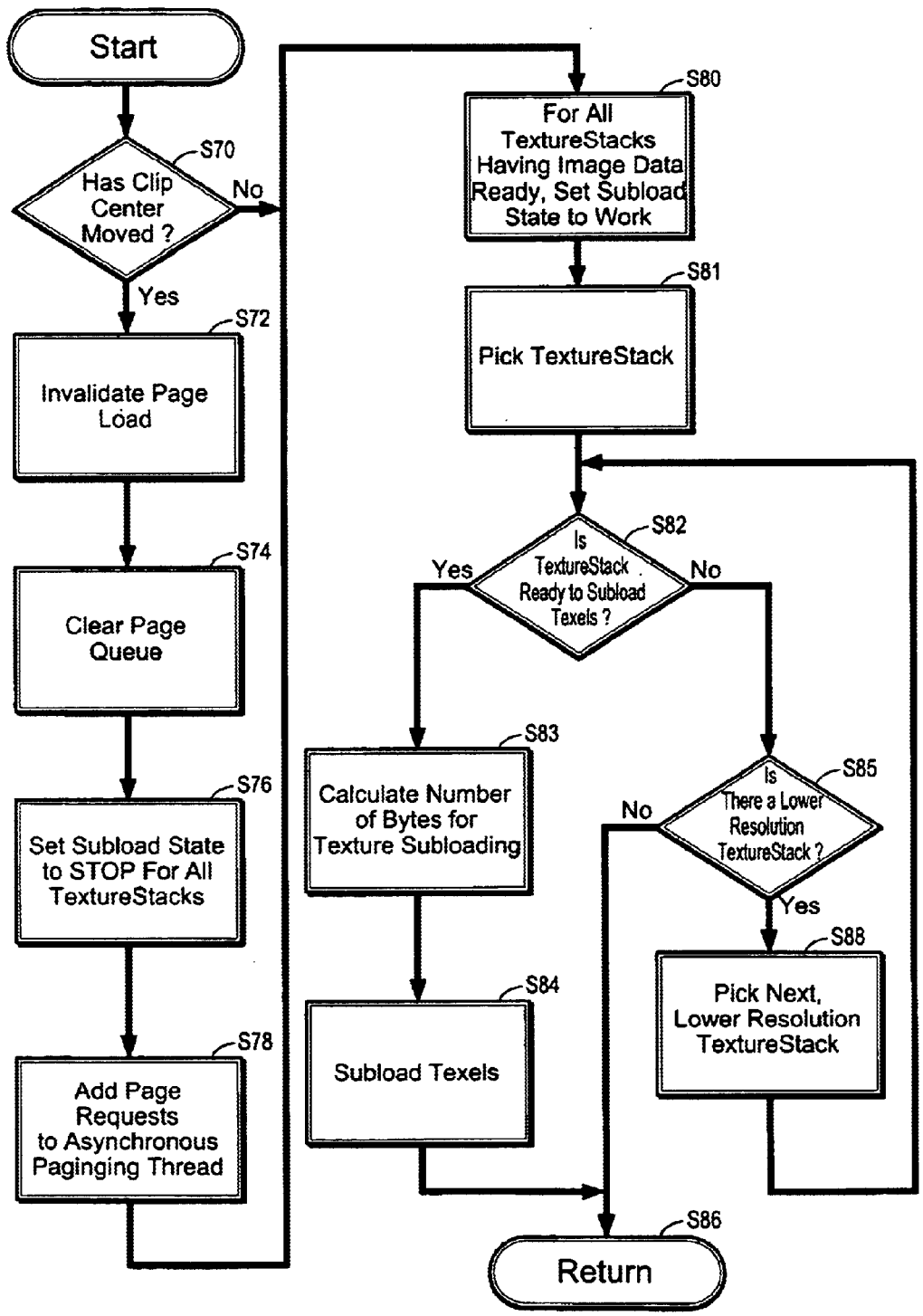

The whole process of updating TextureStack objects can be divided into two parts. First, the corresponding image data must be retrieved from the computer readable medium 36 which is also referred to herein as a disk for discussion purposes only. Second, texel data of the corresponding OpenGL textures must be updated. These procedures are performed in the post draw callback. FIG. 7A is a UML activity diagram for the node post draw callback. FIG. 7B is a flow diagram for implementing the post draw call back.

Disk and file I/O are rather time consuming operations. Accordingly, for real-time rendering it would be beneficial if all CPU and time intensive operations were done asynchronously if possible. Therefore, paging of necessary image data from computer readable medium 36 to main memory 30 is performed as an asynchronous paging or load thread, as shown in FIGS. 7A, 7B. Most of the thread behavior is encapsulated in an object of type ImgCache. The ImgCache object spawns the asynchronous load thread that reads data from the disk and generates mipmap levels for the textures represented by the TextureStack objects. Slow data paging and mipmap generation can lead to significant performance degradation in terms of rendering quality, especially if the clipmap center is being relocated frequently by the main program.

The asynchronous load thread runs an infinite loop which processes requests from a paging queue object of type MPQueue. Each request in the queue is a pair of two tokens. The first token is a command token. There are two types of commands: 1) Page Image Data and 2) Generate Mipmap Levels. The second token is a Clip Stack level number (or TextureStack number) for which the command was issued. The ImgCache object allocates an internal image memory buffer for each Clip Stack level, including the Clip Pyramid. The Page Image Data command fills in those buffers with image data based on the size of the Clip Stack level and the coordinates of the center of the corresponding TextureStack object. If image data spreads across multiple tiles, the paging mechanism is responsible for obtaining data from multiple files.

As shown in FIG. 7B, a determination is first made whether the clip center has moved. One of the aspects of the paging queue functionality is the interaction between the main application thread and the asynchronous paging thread. As soon as the main application thread decides that the clipmap center has to be moved, it issues a Generate Mipmap Levels command for the TextureStack objects. The main application thread should also clear the paging queue. In addition, due to the asynchronous nature of the paging mechanism, the paging thread may still be busy processing a request from the queue. Thus, the processing results of this lingering request should be invalidated after the processing has finished. Otherwise, one or more of the TextureStack objects may end up with invalid texel data. Accordingly, if the clip center has moved (Yes, Step S70), the page load is invalidated (Step S72) and the page queue is cleared (Step S74). The Subload state is then set to STOP for all TextureStacks (Step S76) and Page requests are added to the Asynchronous paging thread (Step S78). After Step S78 or if the clip center has not moved (No, Step S70), the Subload State is set to WORK for all TextureStacks that have image data ready (Step S80). The TextureStack that is one level above the highest resolution TextureStack used during the previous frame is then picked (Step S81). A determination is then made whether the TextureStack is ready to subload texels. If the TextureStack is ready to subload texels (Yes, Step S82), the number of bytes for texture subloading is calculated (Step S83) and the texels are subloaded (Step S84). The process then returns (Step S86). If the TextureStack is not ready to subload texels (No, Step S85), a determination is made whether there is a lower resolution TextureStack. If there is no lower resolution TextureStack (No, Step S85), the process returns (Step S86). If there is a lower resolution TextureStack (Yes, Step S85), the next lower resolution TextureStack is chosen (Step S88) and the process returns to Step S82 for determining whether the new TextureStack is ready to subload texels.

Figure 12:
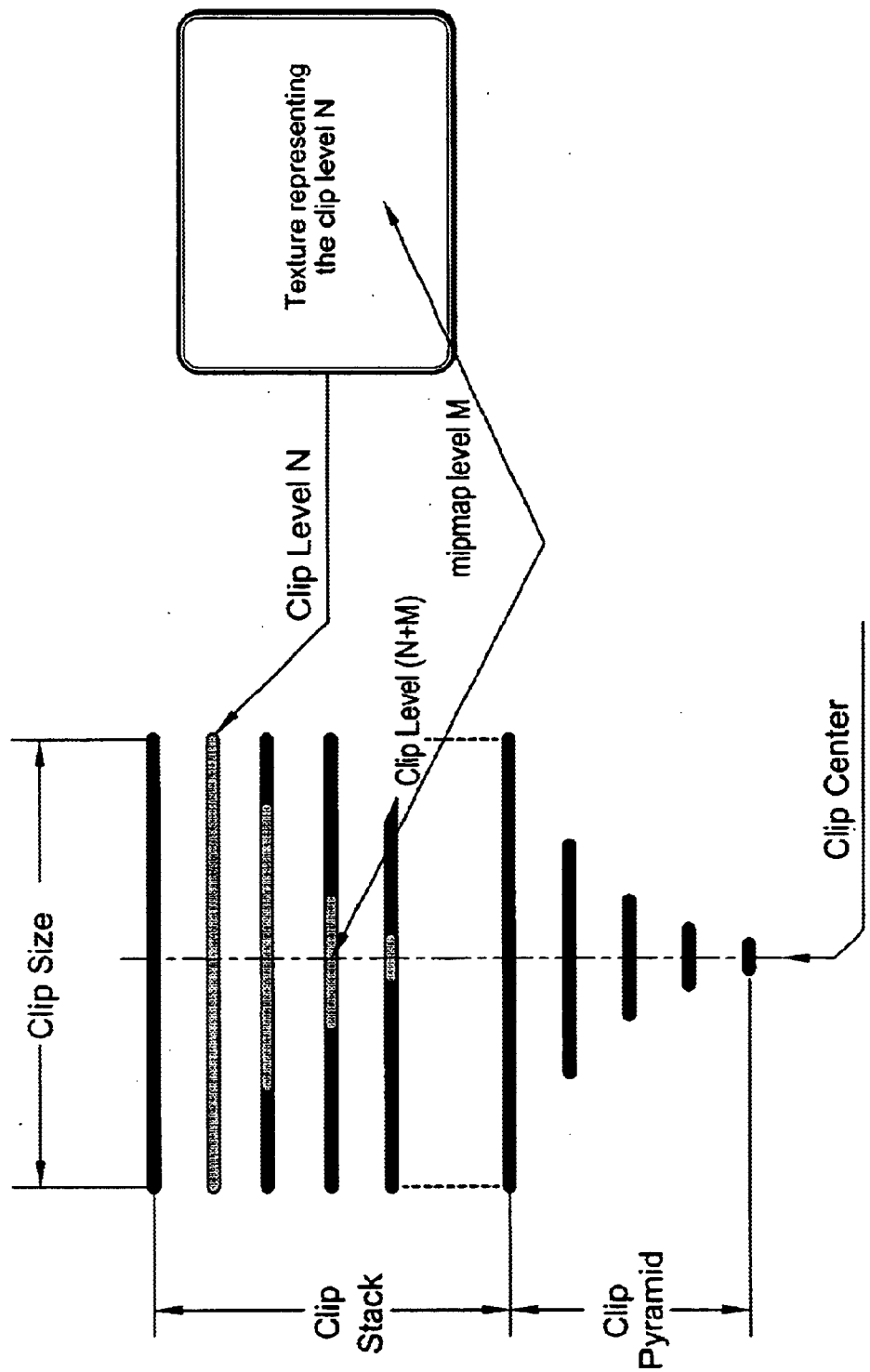
FIG. 12 is a diagram illustrating mipmap levels.

Mipmap generation for textures representing the clip levels can be effectively performed by the paging thread. Referring to FIG. 12, suppose it is needed to generate a mipmap level M for a TextureStack object that represents clip level N. Texels that form mipmap level M of the texture that represents the clip level N are a subset of the clip level (N+M). Accordingly, the texel data for the mipmap level M is actually a subset of the image data kept in the internal buffer (M+N) of the Imgcache object. The proper subset can thus be chosen based on the relative location of the center of TextureStack N with respect to the center of TextureStack (M+N) (or the clip pyramid, if (M+N) is greater than the total number of TextureStacks).

The center of the subregion of the clip level (M+N) that serves as the source for the mipmap level M can be calculated as follows:

$$dCcu = (-ccu\_MN + ccu\_N) \quad (7)$$

$$dCcv = (-ccv\_MN + ccv\_N) \quad (8)$$

$$coeff = texRes * imgSize/(texRes\_inset * imgSize\_inset) \quad (9)$$

$$cnt\_c = (0.5 + dCcu * coeff/imgSize) * sizeX \quad (10)$$

$$cnt\_r = (0.5 + dCcv * coeff/imgSize) * sizeY \quad (11)$$

where, ccu_N and ccv_N are texture coordinates of the clip center of the clip level N, ccu_MN and ccv_MN are texture coordinates of the clip center of the clip level (M+N), texRex is a texel resolution in database units of the virtual texture at the highest level of resolution, imgSize is the virtual texture size in texels at the highest level of resolution, texRes_inset is the texel resolution at the clip level (M+N), imgSize_inset is the size of the clip level (M+N), sizeX and sizeY are dimensions of the mipmap level M of the texture that represents the clip level N, cnt_c and cnt_r are column and row locations of the center of the subregion of the clip level (M+N) that is the source of the image data (texels) for the mipmap level M.

Thus, the mipmap generation routine iterates over all the mipmap levels of the texture representing the clip level N. For each mipmap level M, it computes the center of the subregion of the clip level (N+M) that is the source and copies image data to the corresponding mipmap level of the texture.

Figure 8:
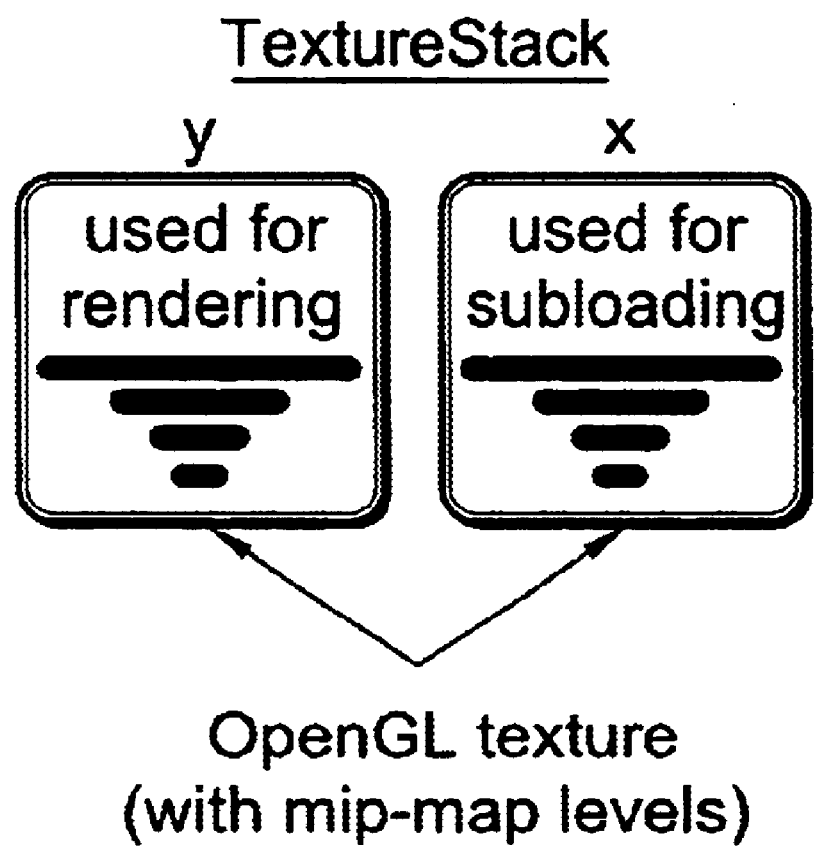
FIG. 8 is an exemplary representation for describing a TextureStack object switch.

The asynchronous data paging and mipmap generation mechanism described herein moves the texture information from disk to main memory. The next move is subloading texel data from main memory into the texture memory. The performance of the texture subloading operation is determined by the underlying hardware, operating system support, and the OpenGL driver. The operation is time consuming providing a large amount of texel data that needs subloading. Therefore, to provide real-time rendering frame rates, the texel data subloading for the textures represented by the TextureStack objects should be spread across the frame boundaries. That is, only a portion of the total amount of texel data is moved at a time into texture memory. This is done on a per frame basis. The amount of texel data to be subloaded each frame can be either pre-defined or computed dynamically at run-time based on the desired frame rate and overall graphics hardware and software performance of the system. Subloading of a 1 Kb by 1 Kb texture, for example, with all mipmap levels typically takes several frames. To avoid undesired visual anomalies, a double-buffering technique can be used. With this technique as shown in FIG. 8, each TextureStack object may use two textures: one for rendering (area Y) and one for subloading (area X). Once subloading is finished, the object swaps the two textures so that one of the textures is ready for rendering and the other one is ready for subloading new texel data.

Figure 9:
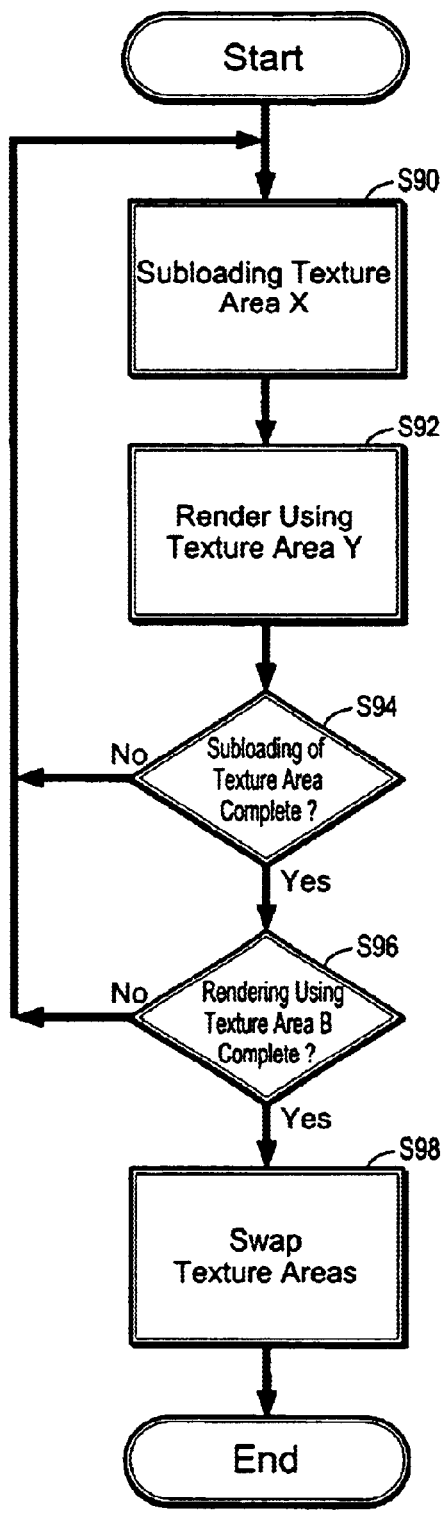
FIG. 9 is a flow chart for describing the TextureStack object switch.

FIG. 9 is a flow chart further describing the double buffering technique. In step S90, texture area X is subloaded, while the geometry node is being rendered using texture area Y in step S92. In step S94, a determination is made whether subloading of texture area X is complete. If subloading is not complete (No, Step S94), the process returns to Step S90. If subloading is complete (Yes, Step S94), a determination is made whether rendering using texture area Y is complete. If rendering is not complete (No, Step S96), the process returns to Step S90. If rendering is complete (Yes, Step S96), the texture areas X and Y are swapped (Step S98). Texture area Y is then subloaded, while Texture area X is used for rendering the next frame. The process then repeats. Subloading is performed in post-draw, during the relatively short period of time until the total frame time reaches the desired frame time. Therefore, the decision whether subloading for a particular TextureStack is finished or not may be made in post-draw since the subloading itself happens in post-draw and the amount of data that is being subloaded every frame can be calculated dynamically.

As described above, one of the purposes of the ImgCache object is to provide robust image data paging by optimizing disk and file I/O operations. Optimization of the disk and file I/O operations minimizes bottlenecks that may occur during those operations. Therefore, optimized implementation of the ImgCache object is important for good performance. High-speed sequential file access may be used for fast data paging. Out-of-the box read and write performance for some file control systems may be sufficient for large page requests, although the overhead for small page requests can be quite high. Since the size of the page request may vary, depending on the amount of image data that is requested from a tile file, more optimum performance may be achieved by bypassing the file system cache for large page requests. For this optimization, most of the file I/O and image manipulation functionality is implemented in the ImgUtils class. When opening a file for large page requests, the ImgUtils class may instruct the operating system to open the file with no intermediate buffering or caching.

Figures 10A, 10B:
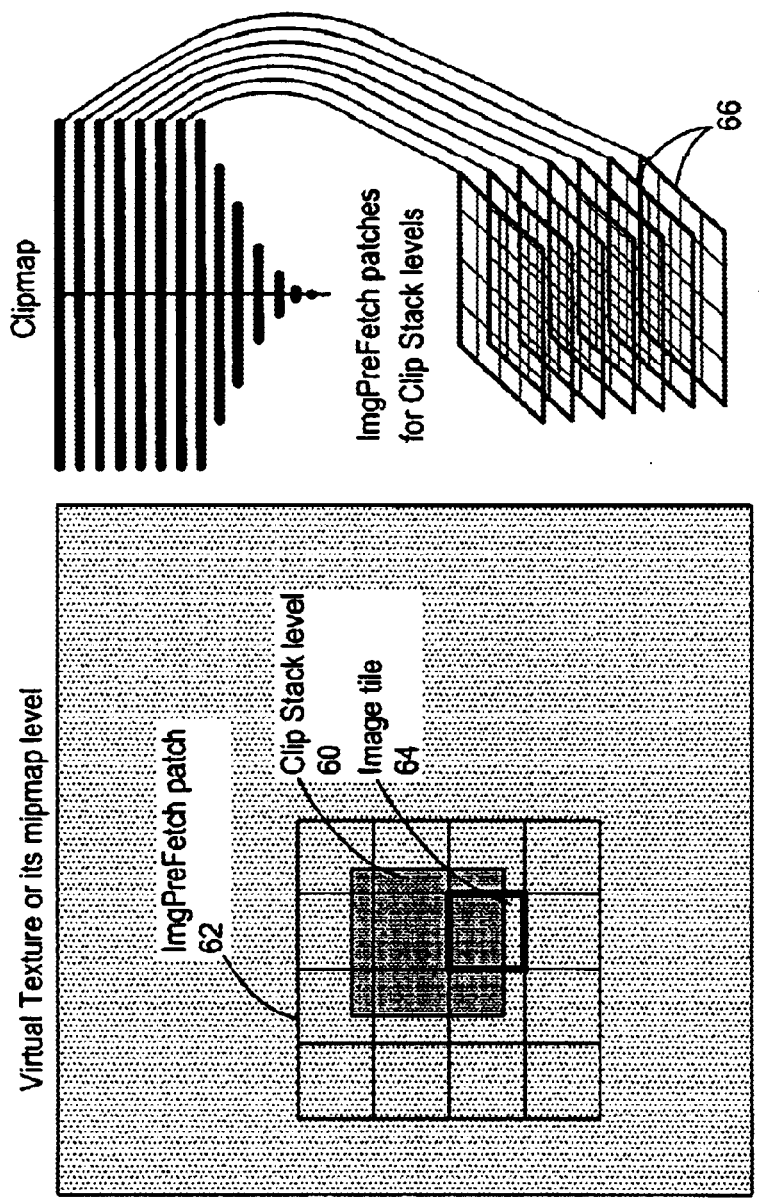
FIGS. 10A, 10B are exemplary representations for describing an image prefetch procedure.
Figure 13:
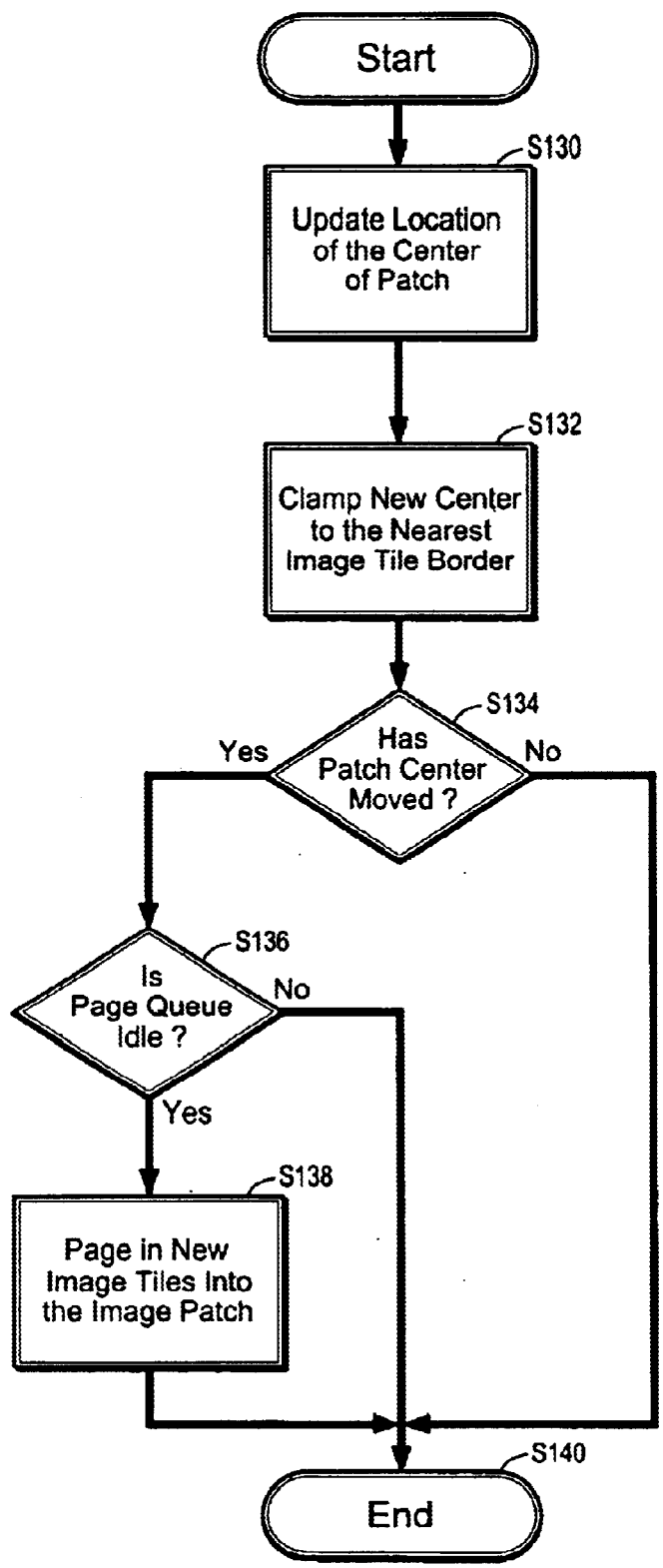
FIG. 13 is a flow chart for describing an image prefetch procedure.

Further optimization can be achieved by prefetching data likely to be loaded into the clipmap in the near future. For example, as shown FIG. 10B, each level of the clipmap can be represented by an array 66 of tiles. Since the asynchronous data paging thread is idle if its paging queue is empty, this idle state can be used to an advantage and the overall paging performance can be improved by paging in the image data from the tile files surrounding the current locations of the centers of the TextureStack objects asynchronously during the idle time. In this case, the image data from neighboring tiles would then be available to the Imgcache object in main memory beforehand. In other words, the prefetch can be used to request disk reads for image tiles likely to be loaded into the clipmap in the near future. Memory copy operations are significantly faster than file I/O. Therefore, overall paging performance can be improved. This functionality is implemented in the ImgPreFetch class. The ImgPreFetch class contains an array of tile patches. As shown in FIG. 10A, each image tile 64 is potentially a subset of a Clip Stack level 60. An ImgPreFetch patch 62 is a two dimensional array of tiles 64, where each tile represents image data from a tile file. The patch size is configurable. By default, the patch size covers twice the number of tiles in both horizontal and vertical directions that are needed to page image data for a particular Clip Stack level. As shown in FIG. 10A, if each Clip Stack level 60 is represented by a 2×2 tile array, the ImgPreFetch patch size 62 is a 4×4 array of tiles. In this way, the ImgPreFetch class can utilize image data coherence when the clipmap center is moved at run-time. The number of patches can be calculated based on the patch size and the image tile size. For example, if a number of tile files for a mipmap level of the virtual texture is less than the size of the patch, then there is no need to create a tile patch for that level. The tile patches will move with the corresponding Clip Stacks levels. That is, tile patches are selected and paged into main memory based on movement of the centers of the Clip Stack levels. The centers of the patches are aligned with centers of the Clip Stack levels and than clamped to the nearest tile border for that level. Clamping to the nearest image tile border is a performance optimization that simplifies disk I/O. FIG. 13 is a flow chart of an ImgPreFetch update algorithm.

In Step S130, the location of the center of the patch is updated. In Step S132, the new center is clamped to the nearest image tile border. A determination is then made whether the patch center has moved. If the patch center has not moved (No, Step S134), the process ends. If the patch center has moved (Yes, Step S136), a determination is made whether the page queue is idle. If the page queue is not idle (No, Step S136), the process ends. If the page queue is idle (Yes, Step S136), new image tiles are paged into the image patch (Step S138) and the process ends.

A real-time system such as that described herein may use statistics to further improve efficiency. Statistics are important because they provide a user with information about system performance at run-time. Also, performance statistics can be used as feedback for the system load management and other run-time optimizations.

The following exemplary statistics can be determined and may potentially be utilized to optimize performance:

1. For each TextureStack object, a number of times (per frame) that the TextureStack object could not be selected for rendering with a geometry node because its (u,v) bounding box is too small;
2. For each TextureStack object, a number of times (per frame) that the TextureStack object was used for rendering;
3. Number of times (since the first frame) that no TextureStack object was available for rendering;
4. Number of times (since the first frame) that the Imgcache object could not obtain an image data from the ImgPreFetch so that it had to page it directly from the disk;
5. Number of times (since the first frame) that the Imgcache object paged data directly from the disk;
6. Total number of bytes paged by the ImgCache object; and
7. Total number of bytes paged by the ImgPreFetch object.

Figure 11:
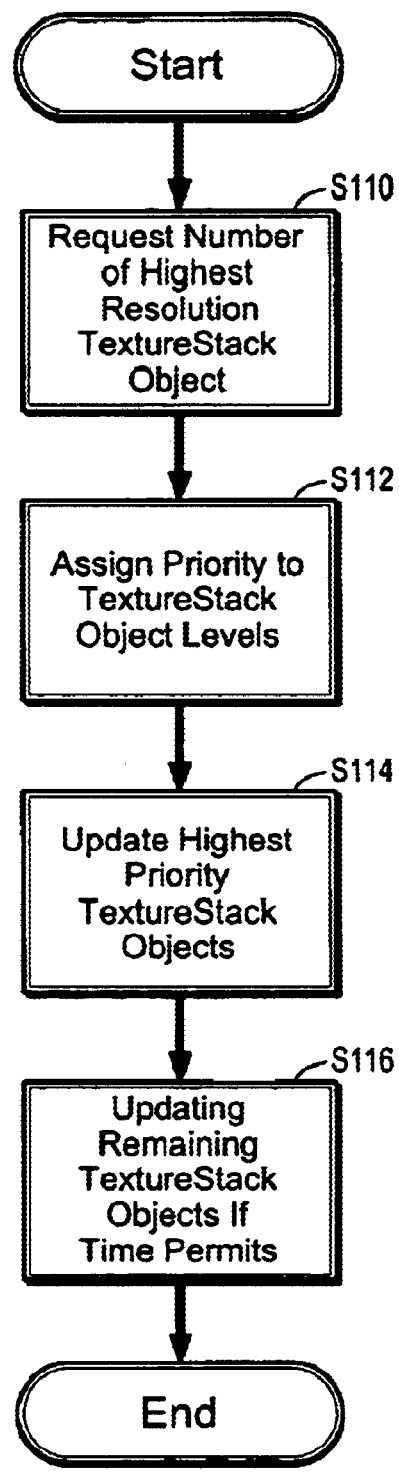
FIG. 11 is a flow chart for describing a method of updating TextureStack objects.

The following is a description of two optimizations based on statistic 2 described above with reference to FIG. 11. To manage the run-time of the system, a Manager object (See FIGS. 4A, 7A) is provided. The Manager object interacts with a user, creates objects, configures the objects, and processes user requests for the clipmap center relocation. The Manager object can use the statistical feedback to prioritize handling of the TextureStack objects. In Step S110, the Manager object requests the number (level) of the highest resolution TextureStack object that was used for rendering during the previous frame (actually, it uses this number decreased by one as a predictive mechanism). All TextureStack objects starting with this number are prioritized (Step S112). The TextureStack objects are updated in priority order, with objects that correspond to higher resolution or lower resolution Clip Stack levels having higher priority, depending on the application (Step S114). For example, if the application is a high altitude flight simulator, the resolution needed is reduced and a low LOD can be used. Therefore, there is no need to update TextureStack objects that correspond to Clip Stack levels of higher resolution, since those levels are not used for this particular rendering. However, if the application is simulating a low altitude flight (or driving), then high-resolution Clip Stack levels and corresponding TextureStack objects should be updated first, to provide consistent visual results. It should be noted that all of the TextureStack objects may eventually be updated. However, objects that are most likely to be presently used for rendering are handled first. TextureStack objects with lower priority can be updated after high priority objects are updated if there is sufficient time (Step S116). This optimization procedure has additional run-time benefits. As discussed above, texel data is subloaded for each frame in the post draw call back. By subloading texture for one TextureStack object per frame, the number of OpenGL texture binds per frame can be minimized.

The second statistic based optimization utilizes a similar method as described above with respect to FIG. 11. However, in this case, the ImgPreFetch object prioritizes handling of the image patches based on their usage. The second statistic, as mentioned above, provides a feedback on the Clip Stack level usage by the rendering system. The ImgPreFetch object can then prioritize updates of the image patches based on this feedback. In this way, paging can be made more efficient because the frame coherent image data is being paged first, with higher or lower resolution data having higher priority depending on the application.

The present embodiments can use several methods to control texture subloading. The first method allows a user to specify a fixed number of bytes to subload every frame. The second method is more sophisticated and uses frame-rate statistics to control the amount of subloading. As described above, the present system gathers statistics about the texture subloading through put. The texture subloading through put estimates how many bytes per second the current hardware/driver can subload. Additionally, VegaNT Scene Graph, for example, can be used to calculate for each frame the difference between the desired and actual frame times. Based on this information and the frame-rate control option (free or limited), the present system can calculate the number of bytes that will be subloaded for a particular frame. The overload and underload gain coefficients scale the computed number of bytes, therefore providing a more conservative or precautionary number. For example, the number of bytes to be subloaded during a particular fame can be set in a frame rate base subloading control mode and can be calculated based on the following:

$$NBytes = avgSubloadSpeed * allowedTime * underloadGain \quad (12)$$

where, avgSubloadSpeed is an average texture subloading speed, as estimated by the Stats class, allowedTime is the total amount of time (in seconds) that subloading is allowed to spend and underloadGain is a scaling coefficient ranging from 0.0 to 1.0.

Figure 14:
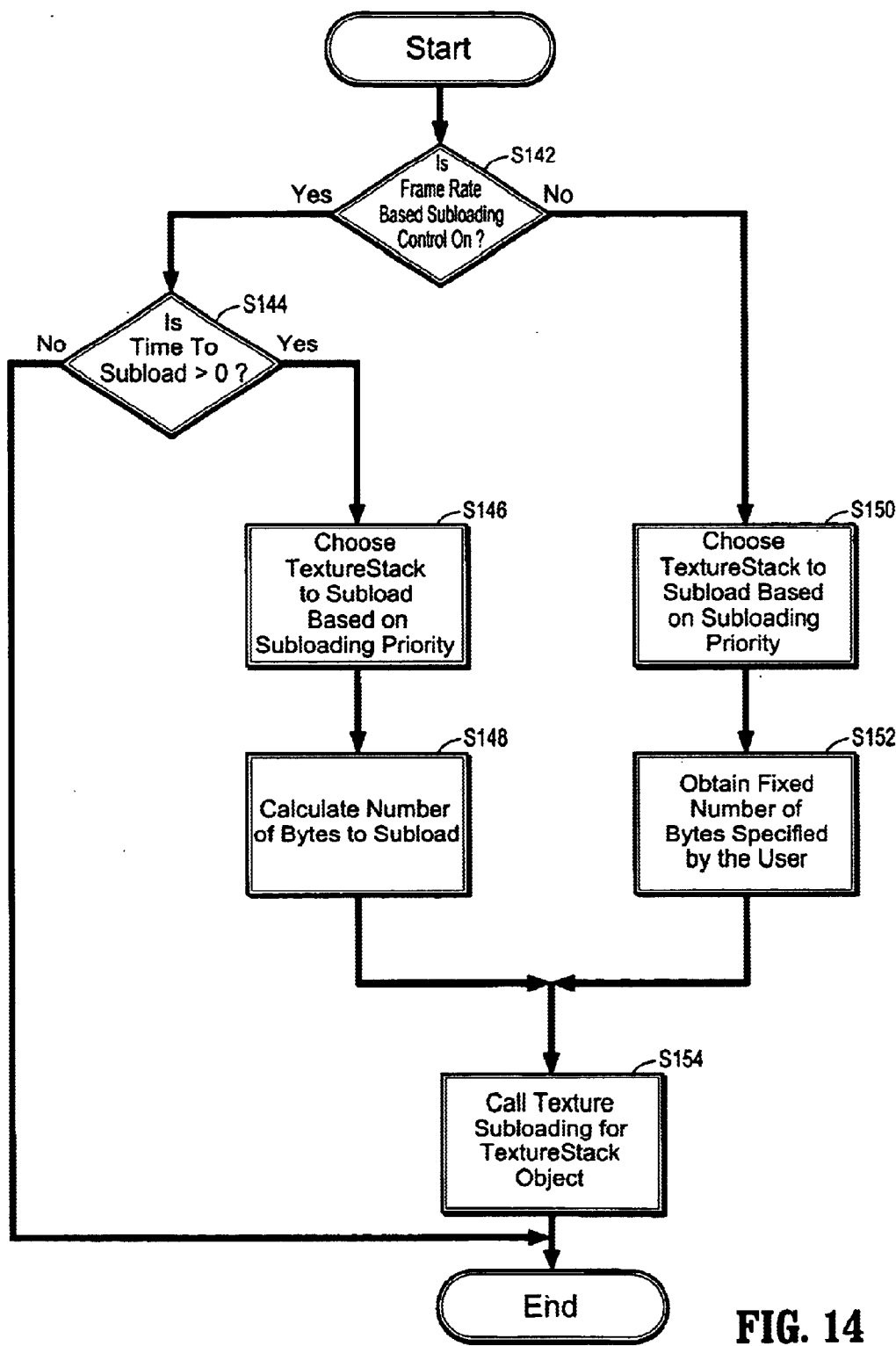
FIG. 14 is a flow chart for describing a subload procedure.

FIG. 14 is a flow chart for describing this procedure. Initially, a determination is made whether the frame rate based subloading control mode is to be used. If the frame rate based subloading control mode is not to be used (No, Step S142), a TextureStack is chosen to subload based in subloading priority (Step S150). A fixed number of bytes as specified by the user are then obtained (Step S152). The texture subloading is then called for the TextureStack object (Step S154). If the frame rate based subloading control is to be used (Yes, Step S142), a determination is made whether the time to subload is greater than zero. If the remaining time is greater than zero (Yes, Step S144), a TextureStack is chosen to subload based on subloading priority (Step S146), and the number of bytes to subload is calculated (Step S148). The texture subloading is then called for the TextureStack object (Step S154). If there is no time remaining for subloading (No, Step S144), the process ends.

It may not always be necessary to use all mipmap levels for the textures represented by the TextureStack objects. For example, as described above, the ImgCache object can generate mipmap levels for the textures represented by the TextureStack objects. Texel data is then subloaded from main memory into OpenGL textures in texture memory. Both stages of mipmap handling can be time consuming, especially the subloading part. However, depending on the application, not all of the mipmap levels may necessarily be used. For example, if the application is a fly-through with an orthographic camera over a flat terrain, then only a few high-resolution mipmap levels are going to be used since a lower LOD is all that will be necessary. Therefore, handling of all other mipmap levels may not be necessary. Accordingly, the number of mipmap levels for the textures represented by TextureStack objects that need to be handled may optionally be made a configurable parameter. The system could then either use this number or dynamically control the number of mipmap levels based on the system load and the application behavior.

The methods, systems and apparatus described herein thus allow simulation of clip-texturing at real-time of interactive frame rates on stock hardware with graphics acceleration, although the methods, systems and apparatus may also be applied to even high end systems.

The present embodiments may be conveniently implemented using one or more conventional general purpose digital computers and/or servers programmed according to the above teachings, as will be apparent to those skilled in the computer art. Appropriate software coding can readily be prepared by skilled programmers based on the above teachings, as will be apparent to those skilled in the relevant art. The present embodiments may also be implemented by the preparation of application specific integrated circuits or by interconnecting an appropriate network of conventional component circuits, as will be readily apparent to those skilled in the art.

Numerous additional modifications and variations of the present disclosure are possible in view of the above-teachings. It is therefore to be understood that within the scope of the appended claims, the present disclosure may be practiced other than as specifically described herein.

What is claimed is:

1. A method of simulating clip texturing, comprising:
providing a clip stack of a portion of a texture image, the clip stack having a plurality of levels, wherein each level of the clip stack includes data representing the portion of the texture image at a different resolution, and for at least one of the plurality of levels of the clip stack, generating a stack of images representing mipmap levels, wherein each stack of images includes data representing a plurality of correlated images of increasingly reduced resolution; and
rendering a geometry formed of at least one graphic primitive, using one of the stacks of images generated.

2. A method as recited in claim 1, further comprising generating for each stack of images, an object containing said data representing the plurality of correlated images of increasingly reduced resolution.

3. A method as recited in claim 2, wherein each said object further contains information identifying a location of a center of the portion of the texture image.

4. A method as recited in claim 1, further comprising:
making a call for a geometry;
selecting one of the stacks of images;
determining whether a bounding box which defines bounds of the geometry is covered by a bounding box which defines bounds of the selected stack of images;
if the bounding box of the geometry is not covered by the bounding box covered by the selected stack of images, selecting a next one of the stack of images and repeating the determining; and
if the bounding box of the geometry is covered by the bounding box covered by the selected stack of images, rendering the geometry using the selected stack of images.

5. A method of texturing using a computer including a main memory and texture memory, comprising:
providing a storage media including data defining a texture image;
generating a clip stack of a portion of the texture image, the clip stack having a plurality of levels, wherein each level includes data representing the portion of the texture image at a different resolution;
storing the clip stack of the texture image in the main memory;
for at least one of the plurality of levels, generating a stack of images representing mipmap levels, wherein each stack of images includes data representing a plurality of correlated images of increasingly reduced resolution; and
storing the data representing the plurality of correlated images in texture memory.

6. A method as recited in claim 5, further comprising rendering a geometry formed of at least one graphic primitive, using one of the stacks of images generated.

7. A computer readable medium including computer executable code for performing texturing using a clip stack of a texture image, the clip stack having a plurality of levels, wherein each level of the clip stack includes data representing the portion of the texture image at a different resolution, said computer readable medium comprising;
code for generating for at least one of the plurality of levels, a stack of images representing mipmap levels, wherein each stack of images includes data representing a plurality of correlated images of increasingly reduced resolution; and
code for rendering a geometry formed of at least one graphic primitive, using one of the stacks of images generated.

8. A computer readable medium as recited in claim 7, further comprising code for generating for each stack of images, an object containing said data representing the plurality of correlated images of increasingly reduced resolution.

9. A computer readable medium as recited in claim 8, wherein each said object further contains information identifying a location of a center of the portion of the texture image.

10. A computer readable medium as recited in claim 7, further comprising:
   code for calling a geometry;
   code for selecting one of the stacks of images;
   code for determining whether a bounding box which defines bounds of the geometry is covered by a bounding box which defines bounds the selected stack of images;
   code for selecting a next stack of images and repeating the determining, if the bounding box of the geometry is not covered by the bounding box covered by the selected stack of images; and
   code for rendering the geometry using the selected stack of images, if the bounding box of the geometry is covered by the bounding box covered by the selected stack of images.

11. A computer readable medium including computer readable code for performing texturing using a computer including a main memory and texture memory, said computer readable medium comprising:
   code for accessing a storage media including data defining a texture image;
   code for generating a clip stack of a portion of the texture image, the clip stack having a plurality of levels, wherein each level includes data representing the portion of the texture image at a different resolution;
   code for storing the clip stack of the texture image in the main memory;
   code for generating for at least one of the plurality of levels of the clip stack, a stack of images representing mipmap levels, each stack including data representing a plurality of correlated images of increasingly reduced resolution; and
   code for storing the data representing the plurality of correlated images in texture memory.

12. A computer readable medium as recited in claim 11, further comprising code for rendering a geometry formed of at least one graphic primitive, using one of the stacks of images generated.

13. A programmed computer device for simulating clip texturing, comprising:
   a removable storage media reader for inputting a clip stack of at least a portion of a texture image, the clip stack having a plurality of levels, wherein each level includes data representing the portion of the texture image at a reduced resolution;
   a controller for generating for at least one of the plurality of levels of the clip stack, a stack of images representing mipmap levels, each stack including data representing a plurality of correlated images of increasingly reduced resolution; and
   a rendering unit for rendering a geometry formed of at least one graphic primitive, using one of the stacks of images generated.

14. A programmed computer device as recited in claim 13, further comprising a generating unit for generating for each stack of images an object containing said data representing the plurality of correlated images of increasingly reduced resolution.

15. A programmed computer device as recited in claim 14, wherein each said object further contains information identifying a location of a center of the portion of the texture image.

16. A programmed computer device as recited in claim 13, further comprising:
   a calling unit for calling a geometry;
   a selection device for selecting one of the stacks of images; and
   a determining unit for determining whether a bounding box which defines bounds of the geometry is covered by a bounding box which defines bounds of the selected stack of images, wherein if the bounding box of the geometry is not covered by the bounding box covered by the selected stack of images, a next one of the stack of images is selected by said selecting device and the determining unit repeats the determining procedure, and wherein if the bounding box of the geometry is covered by the bounding box covered by the selected stack of images, the geometry is rendered using the selected stack of images.

* * * * *